Patented Jan. 2, 1951

2,536,375

UNITED STATES PATENT OFFICE 2,536,375

GROUTING MATERIAL

George W. Koehn, Columbia, and Augustine P. Myers, Lancaster, Pa., assignors to Armstrong Cork Company, Lancaster, Pa., a corporation of Pennsylvania No Drawing. Application December 27, 1948, Serial No. 67,563

5 Claims. (Cl. 260—29.6)

This invention relates to compositions of matter suitable for grouting various tiles such as plastic tile, enamelled metal tile, ceramic tile, and the like.

Generally speaking, there are three methods of installing tiles. In one method, the tile installation is made by sliding individual tile units over an adhesive coated wall or other surface to butt one tile unit against another tile unit. In this system of installation, the adhesive is squeezed through the joints. This adhesive is wiped to point the tiles. In another method, wherein because of the nature of the adhesive it is necessary to slide the tiles in place, the adhesive which is squeezed through the joints is removed and the tiles are pointed with grouting material. In still another method, the tiles are placed side by side over an adhesive coated wall, and the tiles are then pointed by the application thereto of a grouting material.

Various materials have been used for grouting tiles. Typical of these grouting materials are white Portland cement, putty, resin-containing adhesives, and the like. Generally speaking, however, the grouting materials heretofore used have been unsatisfactory for one or more reasons. Certain of these materials set into hard brittle compositions which readily develop cracks during the normal racking and settling of a building. Certain other of the materials heretofore used are unsatisfactory because they dry out and form cracks in the joint which ultimately result in the grouting material falling out of the joint. Many of these materials yellow with age and, in addition, certain of them remain tacky for various long periods of time during which time dirt is picked up on the surface of the grout rendering the installation of the tile unsightly.

In grouts used for the installation of plastic wall tiles, it is necessary to utilize a material that allows cleaning of the installed tile without using solvents which have an adverse effect upon the plastic tile.

We have found that compositions containing polyvinyl acetate and substantially anhydrous calcium sulfate suspended in aqueous medium to form a thick suspension may be employed as grouting materials for various types of tile. The grouting material of our invention is readily compounded and is characterized by advantageous characteristics such as low shrinkage, resistance to yellowing, water resistance, rapid setting, and the like.

In the practice of our invention, we find it advantageous to utilize approximately 50% to 70% by weight of polyvinyl acetate solids and approximately 50% to 30% by weight of substantially anhydrous calcium sulfate as the solid portion of the suspension. In commercial practice, it is necessary to form the grouting material immediately prior to application to the tile; thus, the polyvinyl acetate component is generally compounded separately and the calcium sulfate or powdered solids component is compounded separately and mixed just prior to application.

While the polyvinyl acetate may be employed without modification, it may be desirable to incorporate plasticizers in the polyvinyl acetate which is advantageously used in the form of an aqueous emulsion. The plasticizers which may be used are any of those known to the art as typified by methyl phthalyl ethyl glycollate, diethylene glycol, and the like. The plasticizer is advantageously added to the polyvinyl acetate emulsion in a quantity such as about 10% to 20% by weight of the polyvinyl acetate solids. However, when grouting plastic tiles with the composition of our invention, the plasticizers are so selected so as to have no adverse effect upon the plastic from which the tile is made.

In compounding the powdered solids portion of the grouting material, anhydrous calcium sulfate may be used alone but, if desired, in some instances, filling materials such as finely divided silica, clays, diatomaceous earth, and the like may be used. It is generally desirable to incorporate a small amount of titanium dioxide or other suitable pigments with the powdered solids.

In a most advantageous embodiment of our invention, we may form a composition including, on a solids basis, about 46% to about 53% polyvinyl acetate, about 5% to about 9% plasticizer, about 34% to about 39% substantially anhydrous calcium sulfate, about 0.5% to about 1% filler and about 2.5% to about 5% pigment. These proportions result in a grouting material having outstanding qualities, including ease of application, rapid setting, flexibility, and the like. It is to be understood, of course, that when ready for use the above materials are dispersed in water which is advantageously supplied by the water in the emulsion of polyvinyl acetate. Generally speaking, we employ an emulsion containing about 50% to about 60% solids.

The following example is given as representative of a typical grouting material made in accordance with our invention. It is to be understood, however, that this example is given merely by way of illustration and not by way of limitation

Example

A paste is formed by mixing 94.8% by weight of polyvinyl acetate emulsion containing 55% solids and 5.2% by weight of methyl phthalyl ethyl glycollate as a plasticizer. A separate compound is formed utilizing 87% by weight of anhydrous calcium sulfate, 3% by weight of silica, and 10% by weight of titanium dioxide. Just prior to use 120 parts of the paste is mixed with 50 parts by weight of the calcium sulfate mixture to form the grout of our invention. On a solids basis, the formulation when ready for use contains the following ingredients in the following proportions by weight:

| Ingredient: | Parts by weight |
| --- | --- |
| Polyvinyl acetate | 37.1 |
| Methyl phthalyl ethyl glycollate | 3.5 |
| Calcium sulfate | 25.9 |
| Silica | 0.7 |
| Titanium dioxide | 2.8 |
| Water | 30.0 |

If desired, the compounding procedure set forth in the above example may be varied as long as the polyvinyl acetate emulsion is maintained separate from the anhydrous calcium sulfate until ready for use. For instance, the plasticizer, pigment, and filler may be incorporated with mixing into the emulsion, for example by ball milling, and the calcium sulfate added just prior to the grouting operation.

One particular advantage of the grout of our invention is the property of rapid setting. The calcium sulfate component sets by absorption of water, whereas the polyvinyl acetate emulsion sets because of loss of water. Thus, our grouting material does not depend upon evaporation of a solvent or other suspending medium for its setting characteristic.

The grouting material of our invention after application is characterized by extremely low shrinkage. The materials do not yellow and have no abrasive action on plastic tiles such as polystyrene tile. They are water-resistant and possess the characteristic of setting rapidly so that no dirt is collected in the joint in which they are used. In addition, the materials are characterized by good adhesion to tile surfaces, yet they are slightly flexible even after setting and do not readily crack.

We have used the term "substantially anhydrous calcium sulfate" to include anhydrous calcium sulfate as well as calcium sulfate hemihydrate. The latter may be used in the practice of our invention advantageously with a plaster retarder, such as "Sodate" retarder, glue, sugar, and the like. However, we generally prefer to use anhydrous calcium sulfate as there is no need to consider the use of a retarder therewith.

While our invention has been described with reference to certain particular embodiments and with reference to certain specific examples, it is to be understood that the invention is not limited thereby. Therefore, changes, omissions, substitutions, and/or additions may be made without departing from the spirit of the invention as defined in the appended claims which are intended to be limited only as required by the prior art.

We claim:

1. A composition of matter suitable for use as a grouting material comprising a mixture containing about 50% to about 70% polyvinyl acetate and about 50% to about 30% substantially anhydrous calcium sulfate suspended in an aqueous medium.

2. A composition of matter suitable for use as a grouting material comprising an emulsion of polyvinyl acetate admixed with powdered anhydrous calcium sulfate, the solids content of said mixture comprising about 50% to 70% plasticized polyvinyl acetate and about 50% to 30% anhydrous calcium sulfate.

3. A pointing grout comprising a relatively thick aqueous suspension of a mixture including about 46% to about 58% polyvinyl acetate, about 5% to about 9% plasticizer, about 34% to about 39% substantially anhydrous calcium sulfate, about 0.5% to about 1% filler, and about 2.5% to about 5% pigment.

4. A pointing grout comprising a relatively thick aqueous suspension of a mixture including about 46% to about 58% polyvinyl acetate, about 5% to about 9% plasticizer, about 34% to about 39% substantially anhydrous calcium sulfate, about 0.5% to about 1% filler, and about 2.5% to about 5% pigment, said polyvinyl acetate being present in the form of an emulsion containing about 50% to about 60% solids.

5. A pointing grout comprising an aqueous dispersion containing substantially the following ingredients in substantially the following proportions by weight:

| | Parts by weight |
| --- | --- |
| Polyvinyl acetate | 37.1 |
| Methyl phthalyl ethyl glycollate | 3.5 |
| Calcium sulfate | 25.9 |
| Silica | 0.7 |
| Titanium dioxide | 2.8 |
| Water | 30.0 |

GEORGE W. KOEHN.
AUGUSTINE P. MYERS.

REFERENCES CITED

The following references are of record in the file of this patent:

UNITED STATES PATENTS

| Number | Name | Date |
| --- | --- | --- |
| 2,152,670 | Shutt | Apr. 4, 1939 |

FOREIGN PATENTS

| Number | Country | Date |
| --- | --- | --- |
| 562,859 | Great Britain | July 19, 1944 |